July 28, 1942.     G. E. WHITE     2,291,596

GEOPHYSICAL PROSPECTING

Filed Sept. 27, 1939

Gifford E. White INVENTOR.

BY [signature] ATTORNEY.

Patented July 28, 1942

2,291,596

UNITED STATES PATENT OFFICE 2,291,596

GEOPHYSICAL PROSPECTING

Gifford E. White, Fredericksburg, Tex., assignor to Standard Oil Development Company, a corporation of Delaware Application September 27, 1939, Serial No. 296,797

3 Claims. (Cl. 175—182)

The present invention is directed to a geophysical method for the exploration of the earth's subsurface. More specifically, the present invention is directed to an improvement on that method of geophysical prospecting which utilizes earth current transients as a source of information from which the presence of subsurface anomalies can be ascertained.

In transient prospecting, as it has been normally practiced over the past several years, it is conventional to have a charging circuit provided with a plurality of batteries and a receiving circuit provided with an oscillograph. In making a record the first step was to close a switch in the charging current. The transient of the current in the charging circuit was substantially a vertical line which terminated when the current reached its maximum steady state value. The resulting earth transient was a curve which deviated from the perpendicular depending upon the nature of the subsurface. This curve in general closely approximated a curve expressed by the equation $e=A(1-e^{-at})$, in which $e$ is the voltage represented by ordinates, $t$ is time represented by abscissa, and $A$ is a constant and $a$ is a constant depending on the transmission characteristics of the ground.

The interpretation of transients has always been a painstaking task by reason of the fact that the differences in transients are quite small. It has long been recognized that these differences would be magnified in the first derivative of the transient, and for this reason it has always been considered desirable to work with such derivatives. Ordinarily these derivatives could be arrived at by computation. The difficulty, however, was that in the computation of the first derivative of the transient, not only the significant portions of the transient were magnified but also the "noise" or "hash" which inevitably accompanies any electrical reception through the ground and which is created presumably by random disturbances was also magnified resulting in a zigzag type of derivative curve which for all practical purposes defied interpretation.

It has now been found that transient prospecting can be greatly facilitated by discharging into the ground in an extremely short period of time a finite, predetermined quantity of electricity and receiving the resulting pulse and recording it with an oscillograph. The resulting curve produced on the record is the first derivative of the transient which would have been received had the same quantity per second of electricity been applied to the ground in such a way as to raise the ground current from zero to a constant steady state value. This will be evident from the following consideration. The curve produced by the method of the present invention is in terms of millivolts per coulomb. That is, the ordinate of any given point on the curve is $$\frac{mv.}{amp./sec.}$$

The ordinary transient is in terms of millivolts per ampere plotted against seconds so that the slope at any given point on the ordinary transients is $$\frac{mv.}{amp./sec.}$$

Thus, it can be seen that any given point on the record produced by the present invention corresponds to the slope of the conventional transient. More concretely, a record produced according to the present invention by discharging one coulomb of electricity into the ground and receiving it is the first derivative of the curve which would have been obtained by producing a transient from a charging circuit having a steady state current value of one ampere.

The particular virtue of the present invention lies in the fact that while the significant portions of the conventional transient are magnified in the order of its first derivative, the "noise" and "hash" is not correspondingly magnified, but conventionally assumes the same value it would in the ordinary transient. This is an advantage that has hitherto been unattainable.

To be more explicit as to the nature of the present invention, the charging circuit consists of a pair of electrodes connected by a conductor in which is arranged a condenser having large capacity, a short discharge time, and a switch. Also connected to the condenser is a source of power such as a generator driven by a gasoline engine. The condenser is charged to its full capacity and then, by closing the switch, is discharged through the earth, the pulse so produced being received by a suitably spaced receiving circuit containing a recording instrument such as an oscillograph.

In the practice of the present invention it is essential that the pulse applied to the earth be of such a short duration, and the distance between the charging circuit and the receiving circuit be such, that the pulse is over before the voltage in the receiving circuit attains more than a fraction of its maximum value. Numerically, the applied pulse should be of a duration not greater than a few thousandths of a second and preferably below one-thousandth of a second. In practice this is attained by using for each earth contact point of the charging circuit a plurality of electrodes mounted in parallel, a sufficient number being used to reduce the resistivity of the circuit to a value such that the condenser can be wholly discharged in the desired time. In practice, this end can be realized by reducing the value of the resistance of the charging circuit, including the earth, to below twenty ohms, and preferably below ten ohms. The capacity of the condenser employed should be so chosen that a pulse having a maximum current value in excess of 100 amperes, and preferably of the order of 200 amperes, and of the duration heretofore specified, is produced.

The present invention may be better understood from the following detailed description of the accompanying drawing in which—

Figure 1:
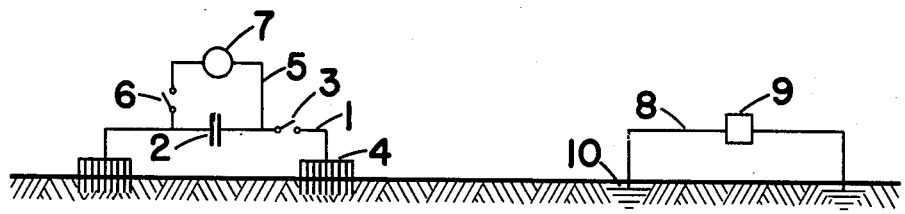
Figure 1 is a front elevation of one form of apparatus which may be employed.
Figure 2:
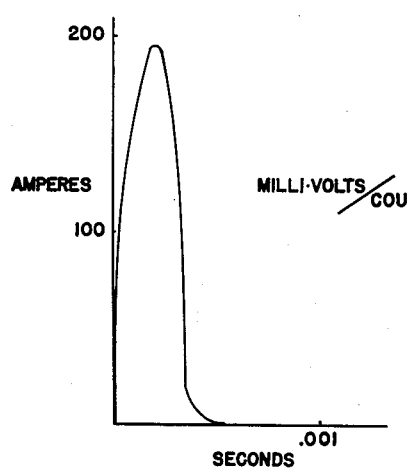
Figure 2 is a graphical illustration of the type of pulse which is utilized in the present invention.
Figure 3:
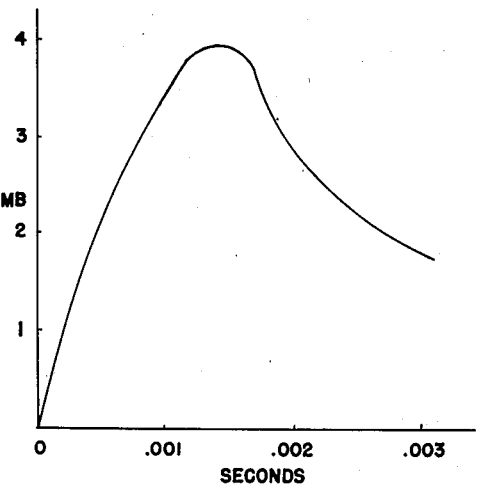
Figure 4:
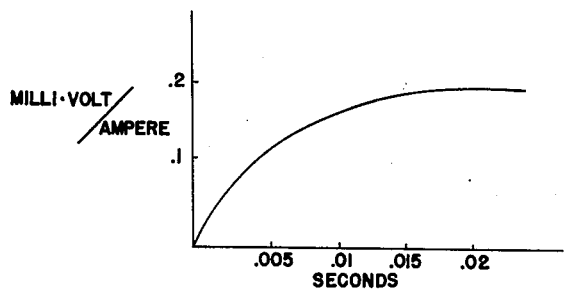

Figure 3 is a graphical representation of the record produced in the receiving circuit from the pulse shown in Figure 2; and Figure 4, by way of contrast, is a graphical representation of the transient which would have been produced by the application of the same quantity of electricity in the charging circuit in such a way as to produce a constant current value of one ampere in the charging circuit.

Referring to the drawing in detail, numeral 1 designates the charging circuit which includes a condenser 2 and a switch 3, and which has at each of its terminals a plurality of electrodes 4 arranged in parallel and fixed in the earth in the usual manner. Connected to circuit 1 on either side of condenser 2 is a condenser charging circuit 5 provided with a switch 6 and a source of power 7 which, as previously pointed out, may be a generator driven by a motor. The receiving circuit consists merely of a conductor 8 to which is connected a recording device, such as an ordinary oscillograph, and which terminates in electrodes 10 spaced from each other in the earth.

The distances between the groups of electrodes in the charging circuit, and the electrodes in the receiving circuit, and the distance between the charging and receiving circuits may be fixed to suit the terrain under investigation. In a typical spread, each group 4, of charging electrodes, is spaced over a distance of about thirty feet and may include twenty or more electrodes, the distance between groups of charging electrodes is about two thousand feet, the distance between receiving electrodes is about one thousand feet, and the distance between the charging circuit and the receiving circuit is about eight thousand feet. For such a spread suitable results can be secured by employing, as condenser 2, one having a capacity of 10 mfd. and charging this condenser to 6000 volts while regulating the number of electrodes in group 4 so as to reduce the resistance of the discharging circuit to about 10 ohms. The pulse obtained with this arrangement will attain a maximum current value of the order of 200 amperes, and the voltage recorded in the receiving circuit will attain a maximum value of the order of 5 millivolts. It will be understood that all of these values are purely illustrative and are not in any sense intended as a definition of the scope of the present invention except insofar as they indicate that a large quantity of electricity is discharged into the ground in an extremely short period of time.

In Figure 2 is shown the type of pulse applied to the earth according to the present invention. In this figure the ordinates are amperes and the abscissae are thousandths of seconds. It will be seen that the pulse is sharp and short, attaining a large maximum current value and lasting considerably less than one thousandth of a second.

In Figure 3 is shown the type of record produced from the pulse shown in Figure 2. In this figure the ordinates are millivolts and the abscissae are one-thousandths of seconds. It will be noted that the pulse is essentially over before the record voltage attains as much as one-half of its maximum value.

In using this record for prospecting purposes, any one of several significant characteristics may be relied upon. For example, the maximum amplitude may be taken as the significant factor. Again, the slope of the curve may be compared with the slopes of other curves obtained in this fashion over the area under investigation. The area under the curve is also significant in that it indicates pure earth resistivity as distinguished from records obtained by previously known methods in which considerably longer pulses are employed and in which the resulting curve is affected by alternating current components of low frequency. For a complete picture, all of the characteristics of the record produced are taken into consideration.

Briefly, then, in investigating an area according to the present invention, a series of identical hookups are made over the area and an identical charge is put into the ground in each hookup. The records produced over the area are then compared for the purpose of detecting anomalous differences. It may be pointed out here that the present invention has the additional advantage over the previously known transient prospecting method that by the use of a condenser as an earth charging device, it can be assured that the pulse will always be the same, whereas, when batteries are employed, the current inevitably varies by reason of unavoidable changes in strength of the batteries under load. Furthermore, the required equipment for the method of the present invention, consisting essentially of the condenser and the charging generator, is extremely light for a given charge as compared to the battery weight which would be required to give the same charge, it having been found that several tons of batteries would be necessary to produce a record which would have changes of the same amplitude as those attainable by the method of the present invention with equipment weighing less than two hundred pounds.

It has heretofore been stressed that the pulse applied must be of extremely short duration. To this end it is essential that the charging circuit be free from inductance, since the effect of inductance in the charging circuit would be to prolong the discharge time of the condenser. In other words, according to the present invention, every possible expedient for reducing the discharge time of the condenser is resorted to.

The nature and objects of the present invention having been thus described and illustrated, what is claimed as new and useful and is desired to be secured by Letters Patent is:

1. In a method of geophysical prospecting in which a charge of current is impressed in the earth at one point and the resulting voltage is received at a remote point, the step of using as the charge a pulse of direct current of substantial magnitude having a duration not substantially in excess of one thousandth of a second.

2. A method of geophysical prospecting comprising the steps of establishing an earth charging circuit in an area to be investigated, setting up a receiving circuit at a point remote from the charging circuit, discharging into the ground, by the charging circuit, a pulse of direct current of substantial magnitude having a duration not substantially in excess of one-thousandth of a second, and recording in the receiving circuit the earth voltage resulting from said pulse.

3. A method, according to the preceding claim, in which the short pulse is a condenser discharge.

GIFFORD E. WHITE.